(12) United States Patent
Li (10) Patent No.: US 10,161,560 B2
(45) Date of Patent: Dec. 25, 2018

(54) INTEGRATED PICOMOTOR MOUNT (71) Applicant: NEWPORT CORPORATION, Irvine, CA (US)

(72) Inventor: Hongqi Li, Redwood City, CA (US)

(73) Assignee: NEWPORT CORPORATION, Irvine, CA (US)

( * ) Notice: Subject to any disclaimer, the term of this patent is extended or adjusted under 35 U.S.C. 154(b) by 517 days.

(21) Appl. No.: 15/008,396

(22) Filed: Jan. 27, 2016

(65) Prior Publication Data
US 2016/0223127 A1 Aug. 4, 2016

Related U.S. Application Data (60) Provisional application No. 62/109,458, filed on Jan. 29, 2015.

(51) Int. Cl.
| H01L 41/053 | (2006.01) |
| H01L 41/09  | (2006.01) |
| H02N 2/00   | (2006.01) |
| F16M 11/18  | (2006.01) |
| F16M 13/02  | (2006.01) |
| H02N 2/12   | (2006.01) |

(52) U.S. Cl.
CPC ........... F16M 11/18 (2013.01); F16M 13/02 (2013.01); H02N 2/126 (2013.01)

(58) Field of Classification Search
CPC ........ F16M 11/18; F16M 13/02; H02N 2/126; H01L 41/053; H01L 41/09
USPC .................. 310/323.01, 323.02, 323.17, 328
See application file for complete search history.

(56) References Cited

U.S. PATENT DOCUMENTS

| 3,320,580 A | 5/1967 | Sykes |
| 3,902,085 A | 8/1975 | Bizzigotti |
| 4,019,073 A | 4/1977 | Vishnevsky et al. |
| 4,453,103 A | 6/1984 | Vishnevsky et al. |
| 4,525,852 A | 6/1985 | Rosenberg |
| 4,590,380 A | 5/1986 | Tamaki |

(Continued)

FOREIGN PATENT DOCUMENTS

| CN | 101470236 | 7/2009 |
| CN | 102565979 | 7/2012 |

(Continued)

OTHER PUBLICATIONS

Agrait, Vertical Inertial Piezoelectric translation device for a scanning tunneling microscope, Rev. Sci. Instrum., Jan. 1992; 63(1):263-264.

(Continued)

*Primary Examiner* — Thomas Dougherty
(74) *Attorney, Agent, or Firm* — Schmeiser, Olsen & Watts LLP (57) ABSTRACT

An adjustable compact mount that may include an integrated configuration that is suitable for use in confined spaces. Some adjustable compact mount embodiments may include a threaded drive screw that is completely disposed within an outer perimeter of the base during use. End caps of high density material may be used to facilitate the compactness of certain embodiments while enabling efficient use of piezoelectric type drive motors for the adjustable compact mounts. Certain coatings may be used on components of some embodiments in order to increase durability.

26 Claims, 9 Drawing Sheets

(56) References Cited

U.S. PATENT DOCUMENTS

| | | |
|---|---|---|
| 4,594,584 A | 6/1986 | Pfeiffer et al. |
| 4,607,166 A | 8/1986 | Tamaki |
| 4,613,782 A | 9/1986 | Mori et al. |
| 4,622,483 A | 11/1986 | Staufenberg, Jr. et al. |
| 4,714,855 A | 2/1987 | Fujimoto |
| 4,647,808 A | 3/1987 | Shibuya |
| 4,727,278 A | 2/1988 | Staufenberg, Jr. et al. |
| 4,775,815 A | 10/1988 | Heinz |
| 4,831,306 A | 5/1989 | Staufenberg, Jr. et al. |
| 4,857,793 A | 8/1989 | Okuno |
| 4,918,351 A | 4/1990 | Kawai |
| 4,933,590 A | 6/1990 | Inoue et al. |
| 4,975,615 A | 12/1990 | Katahara |
| 5,017,820 A | 5/1991 | Culp |
| 5,027,028 A | 6/1991 | Skipper |
| 5,034,647 A | 7/1991 | Ohtsuka |
| 5,059,850 A | 10/1991 | Yoshimura et al. |
| 5,073,912 A | 12/1991 | Kobayashi et al. |
| 5,079,471 A | 1/1992 | Nygren, Jr. |
| 5,140,470 A | 8/1992 | Luecke |
| 5,394,049 A | 2/1995 | Luecke et al. |
| 5,410,206 A | 4/1995 | Luecke et al. |
| 5,543,670 A | 8/1996 | Luecke |
| 5,786,654 A * | 7/1998 | Yoshida .............. H02N 2/025 310/323.17 |
| 5,946,164 A | 8/1999 | Tracy |
| 6,040,643 A | 3/2000 | Bruns |
| 6,114,799 A * | 9/2000 | Yoshida .............. H02N 2/025 310/323.17 |
| 6,211,602 B1 * | 4/2001 | Yoshida .............. H01L 41/0533 310/323.01 |
| 6,232,700 B1 | 5/2001 | Kosaka et al. |
| 6,548,938 B2 | 4/2003 | Moler et al. |
| 6,911,763 B2 | 6/2005 | Ziegler et al. |
| 7,119,478 B1 | 10/2006 | Mentesana |
| 8,482,868 B2 | 7/2013 | Thomas et al. |
| 9,163,334 B1 | 10/2015 | Fossey et al. |
| 2003/0059194 A1 | 3/2003 | Trzecieski |
| 2004/0017620 A1 | 1/2004 | Kaneko et al. |
| 2004/0124744 A1 | 7/2004 | Pease et al. |
| 2004/0124747 A1 | 7/2004 | Bugel et al. |
| 2004/0140736 A1 | 7/2004 | Richter |
| 2005/0006982 A1 | 1/2005 | Williams et al. |
| 2006/0169837 A1 | 8/2006 | Bird et al. |
| 2007/0195435 A1 | 8/2007 | Theriault et al. |
| 2008/0198485 A1 | 8/2008 | Kosmowski |
| 2008/0265806 A1 * | 10/2008 | Tanaka .................. H02N 2/025 318/116 |
| 2008/0307786 A1 | 12/2008 | Hafez et al. |
| 2009/0127974 A1 | 5/2009 | Piotr et al. |
| 2010/0118421 A1 | 5/2010 | Woodard et al. |
| 2010/0290138 A1 | 11/2010 | Thomas |
| 2011/0181151 A1 * | 7/2011 | Kang .................. B28D 5/0082 310/328 |
| 2011/0286122 A1 | 11/2011 | Halpin |
| 2012/0013999 A1 | 1/2012 | Thomas et al. |
| 2013/0271855 A1 | 10/2013 | Thomas et al. |

FOREIGN PATENT DOCUMENTS

| | | |
|---|---|---|
| CN | 103170845 A | 6/2013 |
| CN | 103217287 A | 7/2013 |
| CN | 103541994 A | 1/2014 |
| CN | 104007028 A | 8/2014 |
| DE | 19512080 A1 | 10/1995 |
| JP | 3-121431 | 5/1991 |
| JP | 04-219709 | 8/1992 |
| JP | 04-324408 | 11/1992 |
| JP | 06-141561 | 5/1994 |
| JP | 7-13061 | 1/1995 |
| JP | H0847273 A | 2/1996 |
| JP | 08-251950 | 9/1996 |
| JP | 9-106944 | 4/1997 |
| JP | 0-205788 A * | 8/1997 ............... H02N 2/00 |
| JP | 11-344740 | 12/1999 |
| JP | 2003-241838 | 8/2003 |
| JP | 2004-205410 | 7/2004 |
| JP | 2005-352394 | 12/2005 |
| JP | 2006-345630 | 12/2006 |
| JP | 2007110805 A | 4/2007 |
| JP | 2008-135810 | 6/2008 |
| JP | 2008-215934 | 9/2008 |
| JP | 2009-518821 | 5/2009 |
| JP | 2010-96863 | 4/2010 |
| JP | 2013-174824 | 9/2013 |
| WO | WO 08/087469 | 7/2008 |
| WO | WO 12/009379 | 1/2012 |
| WO | WO 15/160601 | 10/2015 |

OTHER PUBLICATIONS

Definition of Magnetostriction, printed from the internet on Oct. 9, 2006 located at: http://en.wikipedia.org/wiki/Magnetostriction.

Definition of Piezoelectricity, printed from the internet on Oct. 9, 2006. located at: http://en.wikipedia.org/wiki/Piezoelectricity.

Howald et al, Piezoelectric Inertial Stepping Motor and Spherical Rotor, Rev. Sci. Instrum., 63(8):3909-3912 1992.

Magnetostriction and Magnetostrictive materials, printed from the internet on Oct. 9, 2006, located at: http://aml.seas.ucla.edu/research/areas/magnetostrictive/mag-composites/Magnetostriction%20and%20Magnetostrictive%20Materials.

Skipper, Piezoelectric Traction Motor Delivers High Torque, High Power at Low Speed, PCIM Jun. 1992 36-40.

International Search Report and Written Opinion dated Aug. 20, 2008 in International Application No. PCT/IB2007/00602 filed on Jan. 18, 2007 and published as WO 08/087469 on Jul. 24, 2008.

International Preliminary Report on Patentability dated Jul. 30, 2009 in International Application Nno. PCT/IB2007/00602 filed on Jan. 18, 2007 and published as WO 08/087469 on Jul. 24, 2008.

International Preliminary Report on Patentability dated Jan. 24, 2013 in International Application No. PCT/US2011/043754 filed on Jun. 12, 2011 and published as WO 12/009379 on Jan. 19, 2012.

International Search Report and Written Opinion dated Feb. 9, 2012 in International Application No. PCT/US2011/043754 filed on Jun. 12, 2011 and published as WO 12/009379 on Jan. 19, 2012.

International Search Report and Written Opinion dated Apr. 14, 2016 in International Application No. PCT/US2016/015219 filed on Jan. 27, 2016.

International Search Report and Written Opinion dated Jul. 14, 2015 in International Application No. PCT/US2015/025006 filed on Apr. 8, 2015 and published as WO 2015/160601 on Oct. 22, 2015.

Extended European Search Report dated: Aug. 23, 2018 in European Patent Application No. EP16744063.5.

* cited by examiner

INTEGRATED PICOMOTOR MOUNT

RELATED PATENT APPLICATIONS

This application claims priority under 35 U.S.C. section 119(e) from U.S. provisional application Ser. No. 62/109,458 filed Jan. 29, 2015, by Hongqi Li titled "INTEGRATED PICOMOTOR MOUNT" which is incorporated by reference herein in its entirety.

BACKGROUND

Optical devices or elements such as lenses, mirrors, wave plates, filters, volume Bragg gratings, prisms and the like are often mounted to an optical system, and particularly an experimental optical system, with an adjustable mount. An example of an optical system may include an optical bench or base having multiple optical devices and components mounted to the base with an orientation so as to provide an optical path which directs a light beam from one optical device to the next. Beams from lasers or other light sources are generally used for such applications. For such systems, an adjustable mount provides a mechanism to securely fasten an optical element or the like to the optical bench or other component of the optical system and allow for some adjustment of the orientation and/or position of the optical element. For many applications, the adjustable mount should be operable within a confined space without protuberances that interfere with nearby equipment during the adjustment process.

Some existing adjustable mounts may include a first plate configured to have an optical element secured thereto and a second plate disposed adjacent the first plate with the first plate being displaceable relative to the second plate. In some cases, a piezoelectric type drive motor may be used to rotate a screw coupled between the plates in in order to drive the relative displacement between the first plate and second plate. For many such mounts, the drive screw, piezoelectric drive motor or other components of the adjustable mounts may extend outside of an outer perimeter of the first and/or second plate during relative displacement between the first and second plate. In addition, the magnitude of the moment of inertia required to efficiently operate the piezoelectric drive motor may result in a large and bulk mount device that may be unsuitable for use in confined spaces for various applications. Also, the outer surfaces of some components of such mount systems may become worn over time and reduce the efficiency of operation of the adjustable mount.

What have been needed are adjustable mounts that operate efficiently and also allow for compact sizes for use in confined spaces. What have also been needed are adjustable mounts that do not have drive screws or other components of the mount extending beyond the outer perimeter of the plates of the mount during use to further enhance the applicability for use in confined spaces. What have also been needed are adjustable mounts that include components which are durable for efficient and reliable use over an extended period of time.

SUMMARY

Some embodiments of a compact adjustable mount include a base having a flat mounting surface on a bottom portion of the base. The adjustable mount may also include a stage that is substantially fixed relative to the base in all degrees of freedom except a single linear degree of freedom such that the stage may translate in the linear degree of freedom over a predetermined distance with respect to the base. The stage may also include a flat mounting surface on an upper portion of the stage for mounting of optical elements or the like. Such a stage may also be suitable for mounting non-optical components that need to be accurately repositioned during use relative to a fixed mounting surface. The adjustable mount may also include an elongate threaded drive shaft that has a longitudinal axis, a threaded length having a threaded outer surface with at least one thread groove concentrically disposed about the longitudinal axis and driven portion having an outer surface. The threaded drive shaft may be fixed in an axial direction along the longitudinal axis with respect to the base and disposed within an outer perimeter of the base at all times during use. The threaded drive shaft may also be fixed in directions transverse to the longitudinal axis of the shaft with respect to the base and rotatable about the longitudinal axis of the shaft with respect to the base. The adjustable mount may further include a nut which is secured to the stage, which includes a bore disposed about the threaded drive shaft and which includes an engagement structure within the bore that is configured to engage the thread groove of the threaded outer surface of the threaded drive shaft. The nut may be secured to the stage in a configuration that prevents rotation of the nut in a rotational direction about the longitudinal axis of the threaded drive shaft such that rotation of the threaded drive shaft relative to the base results in rotation of the thread groove relative to the engagement structure of the nut and subsequent axial movement of the nut and stage along the longitudinal axis relative to the base as a result of rotation of the threaded drive shaft. An inertia drive motor may be disposed within the base and include a first contact surface and a second contact surface, the second contact surface being disposed in a spaced and substantially opposed relation relative to the first contact surface. In some cases, the first and second contact surfaces may be operatively engaged with the driven portion of the threaded drive shaft such that actuation of the drive motor imparts reciprocating motion between the first contact surface and second contact surface resulting in rotational motion of the threaded drive shaft relative to the base. At least one disk shaped end cap may be secured in fixed relation to an end of the threaded drive shaft. Such end cap embodiments may be disposed within the outer perimeter of the base, include a high density material and include a moment of inertia sufficient for efficient operation of the inertial drive motor.

Some embodiments of a compact adjustable mount include a base and a stage that is fixed relative to the base in all degrees of freedom except a single linear degree of freedom such that the stage translates in the linear degree of freedom. Such compact adjustable mount embodiments may also include an elongate threaded drive shaft that includes a longitudinal axis, a threaded length having a threaded outer surface with at least one thread groove concentrically disposed about the longitudinal axis and driven portion having an outer surface, the threaded drive shaft being fixed in an axial direction along the longitudinal axis with respect to the base, disposed within an outer perimeter of the base, fixed in directions transverse to the longitudinal axis with respect to the base and rotatable about the longitudinal axis with respect to the base. A nut may be secured to the stage, the nut including a bore disposed about the threaded drive shaft. The bore of the nut may include an engagement structure within the bore that is configured to engage the thread groove of the threaded outer surface of the threaded drive shaft such that rotation of the threaded drive shaft relative to the base results in axial movement of the nut and stage along the longitudinal axis relative to the base. An inertia drive motor may be disposed within the base and include at least one contact surface operatively engaged with the driven portion of the threaded drive shaft such that actuation of the inertia drive motor imparts reciprocating motion of the at least one contact surface resulting in rotational motion of the threaded drive shaft relative to the base. In addition, at least one end cap may be secured in fixed relation to the threaded drive shaft with the end cap being disposed within an outer perimeter of the base. The end cap may have a moment of inertia which is configured to be sufficient for efficient operation of the inertia drive motor.

Some embodiments of a piezoelectric inertia drive motor may include an actuator frame having a first support element which includes a first contact surface and a second support element which includes a second contact surface. The second contact surface is disposed in a spaced and substantially opposed relation relative to the first contact surface. The actuator frame may also include a bias spring clip which is engaged with the first support element and the second support element and which is configured to provide a resilient restoring force that resists perpendicular displacement of the first contact surface away from the second contact surface. The actuator frame may further include a piezoelectric element cavity disposed between a first mount surface of the actuator frame and a second mount surface of the actuator frame. A piezoelectric element may be disposed within the piezoelectric element cavity. The piezoelectric element may have a first end secured to the first mount surface and a second end secured to the second mount surface. The piezoelectric element may be configured to expand and contract in response to an electrical driver signal transmitted to the piezoelectric element and be configured such that an expansion or contraction of the piezoelectric element results in respective substantially parallel reciprocating displacement between the first contact surface and the second contact surface.

Certain embodiments are described further in the following description, examples, claims and drawings. These features of embodiments will become more apparent from the following detailed description when taken in conjunction with the accompanying exemplary drawings.

The drawings illustrate embodiments of the technology and are not limiting. For clarity and ease of illustration, the drawings may not be made to scale and, in some instances, various aspects may be shown exaggerated or enlarged to facilitate an understanding of particular embodiments.

DETAILED DESCRIPTION

This application is directed to certain compact adjustable mount embodiments that may be used for mounting a large variety of devices to a stable surface such as a flat top mounting surface of an optical bench or any other suitable surface. The embodiments discussed herein enable a device, such as optical devices or elements, which are mounted to an upper flat mounting surface of a stage of such a compact adjustable mount to be translated in a precise and repeatable fashion relative to the mounting surface of an optical bench or the like. As discussed above, such compact adjustable mounts may be used to mount optical components or elements to a stable mounting surface, such as an optical table and permit precise adjustment of position of the optical element relative to the optical bench or other optical elements disposed on the optical bench. For some embodiments, a stage having a mount surface may be coupled to a base by one or more precision bearing assemblies that are configured to permit relative axial translation between the stage and the base with a high degree of linear precision. The relative linear displacement between the stage and the base may be implemented by a threaded drive shaft which may rotate about its longitudinal axis of the drive shaft and remain axially stationary relative to the base.

A threaded nut or the like may be operatively coupled to a threaded portion of the threaded drive shaft and also secured to the stage such that rotation of the threaded nut relative to the stage is restricted. In this way, rotation of the threaded shaft results in relative linear displacement between the stage and the base. In some embodiments, the threaded drive shaft may be rotated by a piezoelectric drive motor also mounted within the base and operatively coupled to a driven portion of the threaded drive shaft. The piezoelectric drive motor may be coupled by wires or the like to a controller that is configured to generate a drive signal that actuates the piezoelectric drive motor to impart torque to the driven portion of the threaded drive shaft thus rotating the threaded drive shaft by an inertia type drive method. This inertia type drive method may be used to rotate the threaded drive shaft in a rotational direction and angular magnitude to generate a desired amount of angular displacement of the threaded drive shaft and corresponding linear translation of the threaded nut and stage relative to the base. Although the exemplary embodiments shown and discussed herein have the drive motor and threaded drive shaft in the base of the compact adjustable mount, these elements may be suitably disposed within the stage with the threaded nut thus being secured to the base for any of the embodiments shown or contemplated herein.

Figure 1:
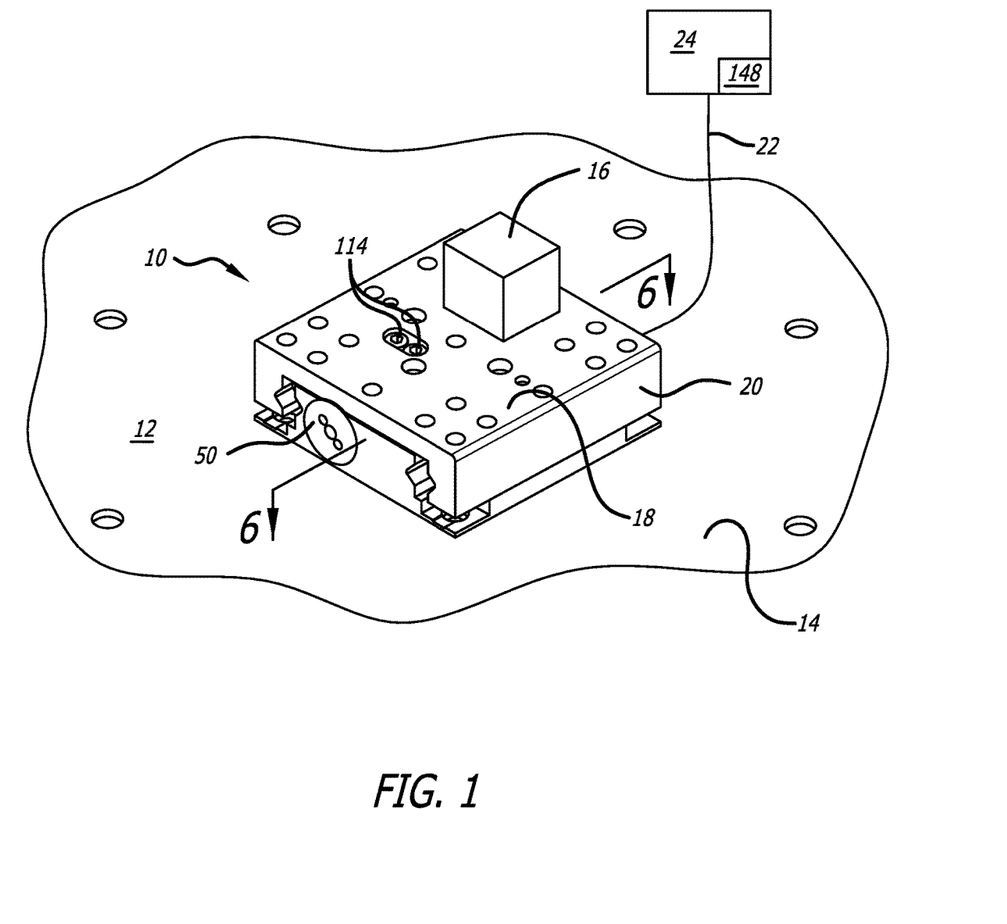
FIG. 1 is a perspective view of a compact adjustable mount embodiment which is operatively coupled to a controller and which is secured to a mounting surface of an optical table.
Figure 2:
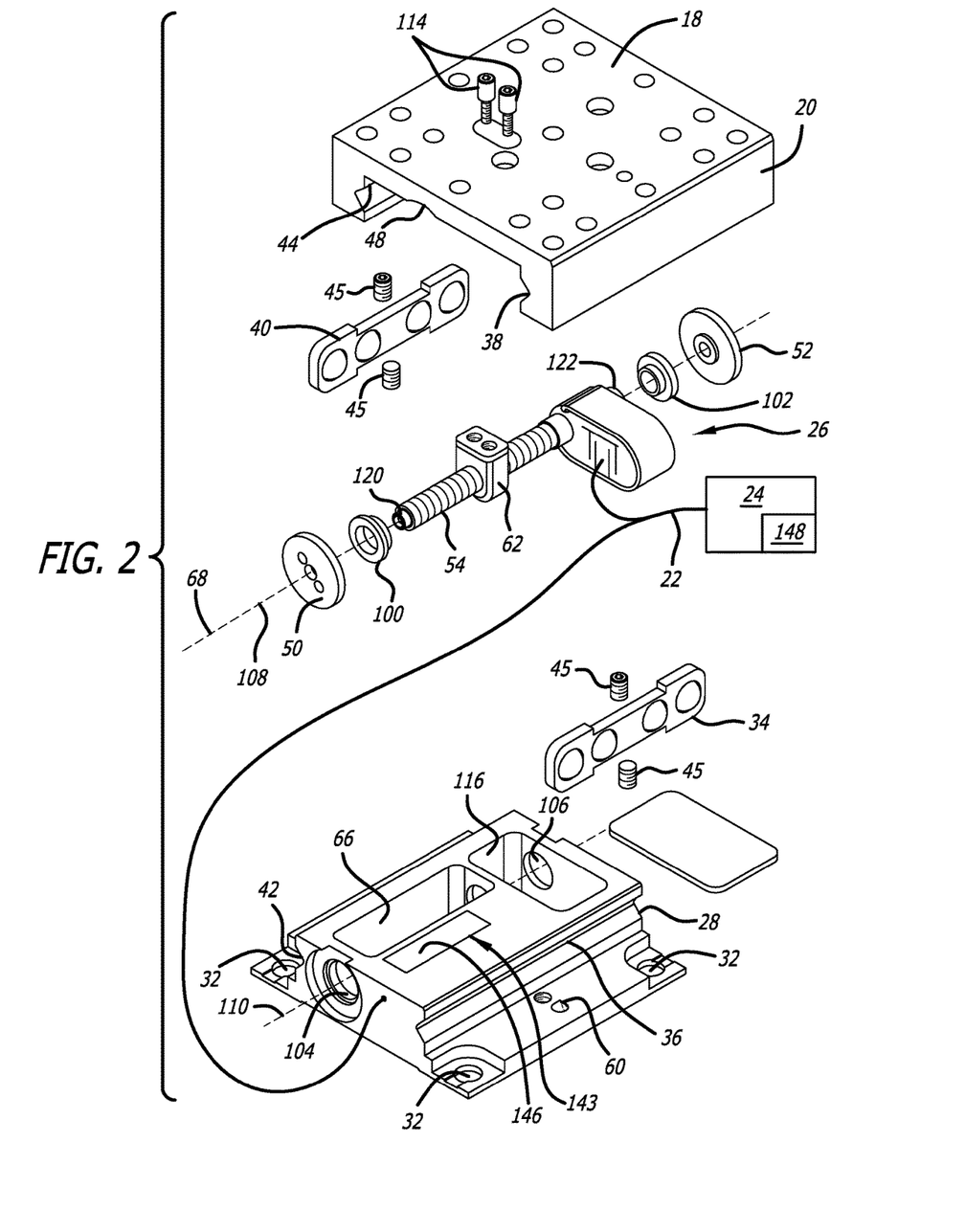
FIG. 2 is an exploded view in perspective of the compact adjustable mount embodiment of FIG. 1.

Referring to the figures, a compact adjustable mount embodiment 10 is shown secured to a mounting surface 12 of an optical bench 14 in FIG. 1. A generic optical element 16 is shown secured to a mounting surface in the form of a top mounting surface 18 of the stage 20 of the compact adjustable mount 10 for purposes of illustration. The compact adjustable mount 10 is coupled by a wire harness 22 to a controller 24 which is configured to generate a drive signal which is communicated through the wire harness 22 to an inertia drive motor such as the piezoelectric inertia drive motor 26 of the compact adjustable mount 10 as shown in FIG. 2. The compact adjustable mount embodiment 10 includes a base 28 having a mounting surface 30 on a bottom portion of the base 28 that may have a flat configuration. The mounting surface 30 on the bottom of the base 28 may be seen in FIGS. 6 and 7. The base 28 may also include one or more mounting holes 32 (see FIGS. 2-5) that are suitable for passage of a mounting fastener that may be used to secure the base to a mounting surface 12. For embodiments that include a plurality of mounting holes 32, the mounting holes 32 may be spaced in a periodic or regularly spaced arrangement that is consistent with the periodic or regular spacing of corresponding threaded holes or the like in the mounting surface 12 of an optical bench 14. Such a periodic spacing may include mounting holes 32 which are disposed on whole increments of 1 inch centers.

Figure 3:
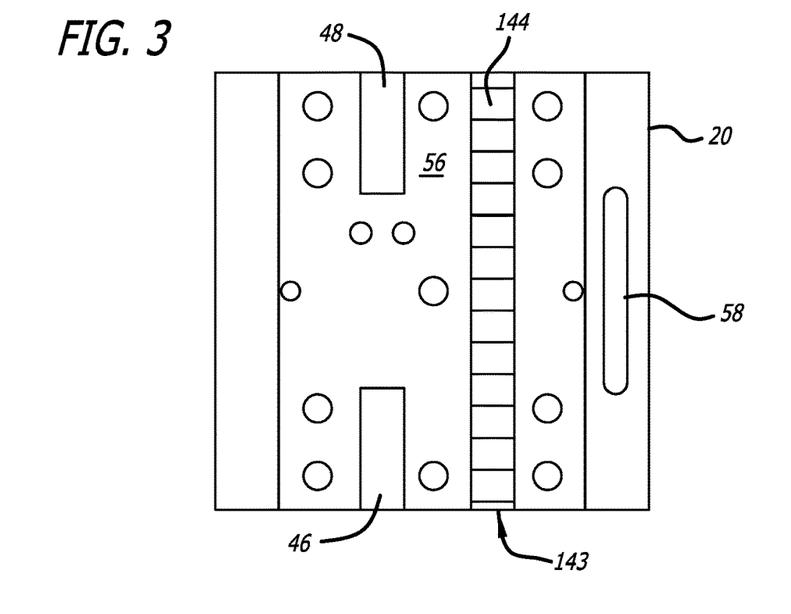
FIG. 3 is a bottom view of a stage of the compact adjustable mount embodiment of FIG. 1.
Figure 4:
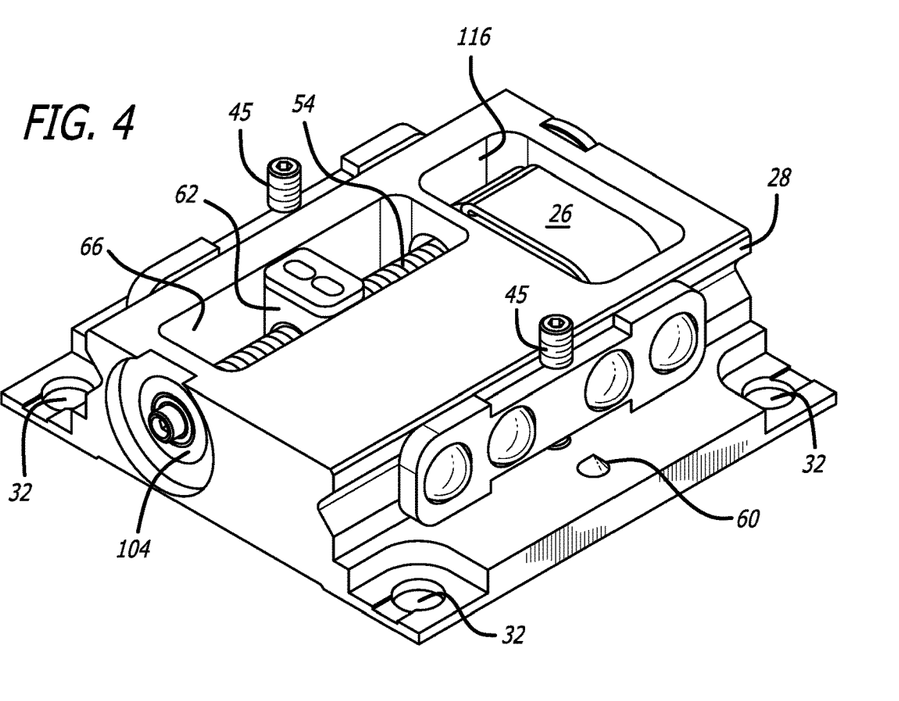
FIG. 4 is a perspective view of the base and some other associated elements of the compact adjustable mount embodiment of FIG. 1.
Figure 5:
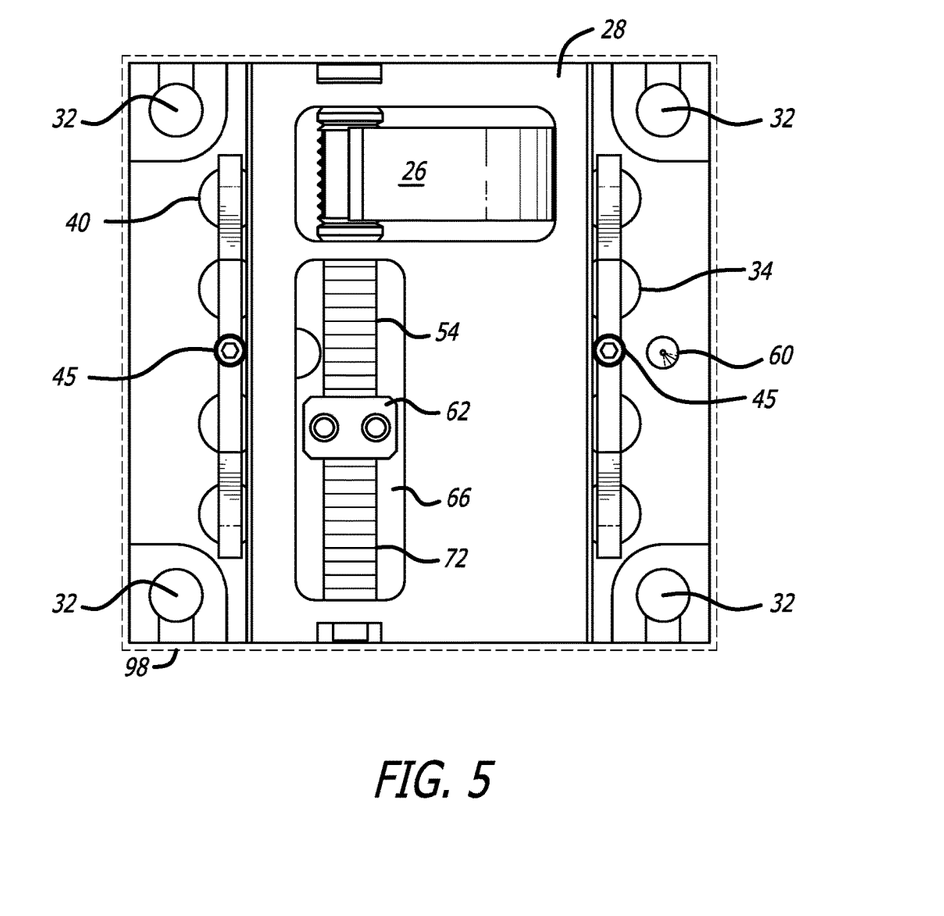
FIG. 5 is a top view of the base shown in FIG. 4.
Figure 6:
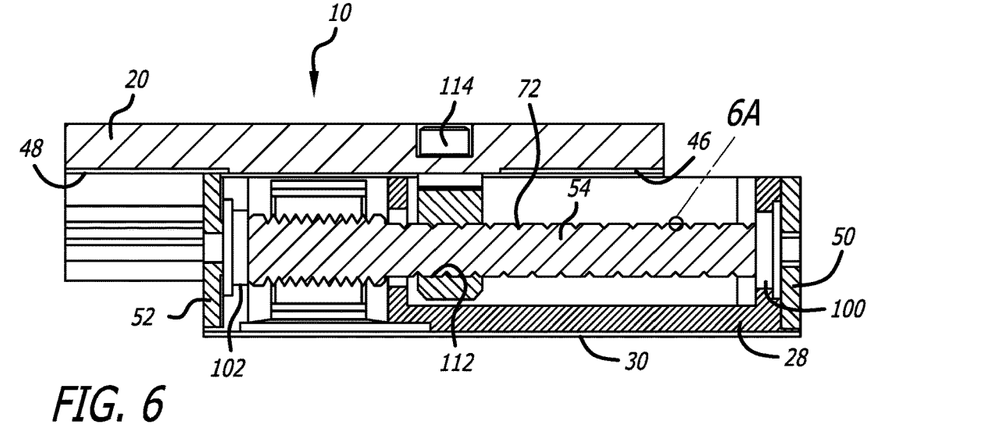
FIG. 6 is a transverse cross section view of the compact adjustable mount embodiment of FIG. 1 taken along lines 6-6 of FIG. 1 with the stage displaced in a linear position which has the threaded nut disposed towards the piezoelectric drive motor.
Figure 7:
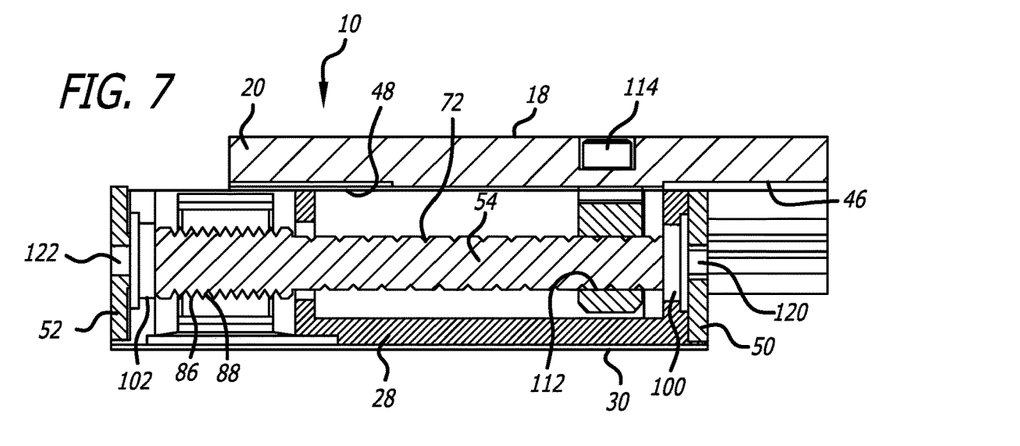
FIG. 7 shows the transverse cross section view of the compact adjustable mount embodiment of FIG. 6 with the stage displaced in a linear position which has the threaded nut disposed away the piezoelectric drive motor.

The compact adjustable mount embodiment 10 shown in the figures includes a stage 20 that is substantially fixed relative to the base 28 in all degrees of freedom except a single linear degree of freedom. Use of the term substantially fixed in this context means fixed except for incidental movement as a result of imperfections or tolerances of bearings, races, bearing or contacting surfaces or the like of components of the compact adjustable mount 10. In this way, the stage 20 may translate in the linear degree of freedom over a predetermined distance with respect to the base 28 as shown in FIGS. 6 and 7. The relative linear motion between the base 28 and the stage 20 may be controlled and facilitated by at least one linear bearing assembly operatively disposed between the base 28 and the stage 20. For the embodiment shown in the figures, a pair of linear ball bearing assemblies is operatively disposed between respective bearing races of the base 28 and the stage 20. In particular, a first linear ball bearing assembly 34 is operatively disposed between a first bearing race 36 of the base 28 and a first bearing race 38 of the stage 20. A second linear ball bearing assembly 40 is operatively disposed between a second bearing race 42 of the base 28 and a second bearing race 44 of the stage 20 as shown in FIG. 2. The bearing assemblies may be captured in place by a plurality of threaded screws 45. For the embodiment shown, the bearing races 36, 38, 42 and 44 are straight grooved structures that extend parallel to each other and parallel to the single linear degree of freedom of the stage. An underside of a body of the stage 20 may include one or more relief slots that provide clearance for structures associated with the base that might otherwise hinder or interfere with movement of the stage 20 relative to the base 28. For the embodiment shown, a first end cap relief slot 46 and a second end cap relief slot 48 are cut into the bottom surface of the stage 20. The first end cap relief slot 46 and second end cap relief slot 48 are configured to provide clearance for outer perimeter surfaces of the respective first end cap 50 and second end cap 52 which may have a disk shaped configuration and which are secured to opposite ends of a threaded drive shaft 54 of the compact adjustable mount 10. In some cases, the first and second end cap relief slots 46 and 48 may have a cylindrical section shape and a depth of about 0.01 inches to about 0.1 inches measured from a plane defined by the nominal bottom surface 56 of the stage body 20 as shown in FIG. 3.

In some cases, the linear range of translation of the stage 20 relative to the base 28 may be determined by a slot-pin structure disposed between the base 28 and the stage 20. In particular, the linear range of motion may be controlled by the length and position of a longitudinal slot 58 in the bottom surface 56 of the stage 20 and a mating pin 60 secured to and extending upward into the longitudinal slot 58 from a top surface of the base 28. The pin 60 and longitudinal slot 58 are mutually sized such that the pin 60 will freely slide within slot 58 until it reaches either end of the longitudinal slot 58 at which point any further motion between the stage 20 and base 28 will be prevented. The longitudinal slot 58 is oriented parallel to the linear degree of freedom of displacement of the stage 20 relative to the base 28. In addition to the slot-pin structure, the linear range of motion of the stage 20 relative to the base 28 may be restricted by a corresponding linear range of the threaded nut 62 over the threaded portion 64 (see FIG. 9) of the threaded drive shaft 54 as well as the spatial limitation of the threaded nut 62 within the boundaries of the threaded drive shaft cavity 66 of the base 28. In particular, FIG. 6 shows the stage 20 displaced from a neutral or center position (as shown in FIG. 1) to a linear position which has the threaded nut 62 disposed towards the piezoelectric drive motor 26 (or to the left in the figure). FIG. 7 shows the stage 20 displaced from a neutral or center position to a linear position which has the threaded nut 62 disposed away from the piezoelectric drive motor 26, or to the right in the figure.

The stage embodiment 20 shown may also include a mounting surface such as the top mounting surface 18 on an upper portion of the stage for mounting of optical elements 16 or the like. The top mounting surface 18 may have a flat configuration suitable for mounting standard optical components and fixtures. Such a stage embodiment 20 may also be suitable for mounting non-optical components that need to be accurately repositioned during use relative to a fixed mounting surface 12. For some embodiments, the base 28 and stage 20 of the compact adjustable mount 10 may be made of any suitable high strength stable material such as steel, including stainless steel, aluminum, composites, including carbon fiber composites and the like. For some embodiments, the compact adjustable mount 10 may have a height from the bottom surface 30 of the base 28 to an upper stage mounting surface 18 of the stage 20 of about 0.3 inches to about 1 inch. In some instances, the compact adjustable mount 10 may have a transverse outer dimension along a direction of translation (and with the stage 20 axially aligned with the base 28 as shown in FIG. 1) of about 0.75 inches to about 4 inches. For some embodiments, the compact adjustable mount 10 may have a transverse outer dimension along a direction of translation (and with the stage aligned with the base) of about 1.5 inches to about 3 inches.

Figure 6A:
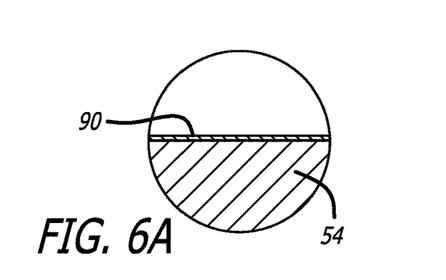
FIG. 6A is an enlarged view of the threaded drive shaft section indicated by the encircled portion 6A shown in FIG. 6.
Figure 9:
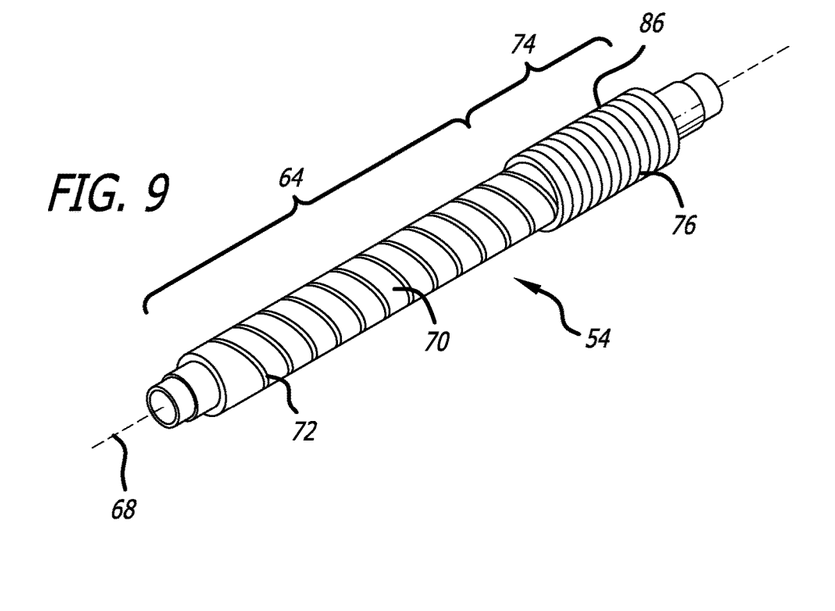
FIG. 9 is a perspective view of the threaded drive shaft of FIG. 8.

The compact adjustable mount embodiment 10 shown includes the elongate threaded drive shaft 54 that has a longitudinal axis 68, the threaded length 64 having a threaded outer surface 70 with at least one thread groove 72 concentrically disposed on the threaded outer surface 70 of the threaded drive shaft 54 about the longitudinal axis 68 and driven portion 74. In some cases, the threaded outer surface 70 of the threaded drive shaft 54 may include a nitride coating to improve lubricity and durability of the threaded outer surface 70. In some embodiments, the driven portion 74 may include an outer surface that may be a grooved outer surface 76 as shown in FIG. 9. The grooved outer surface 76 may include circumferential grooves which are disposed on and/or formed into the grooved outer surface 76. A first contact surface 78 and second contact surface 80 of the piezoelectric drive motor 26 may have corresponding first and second grooved contact surfaces 82, 84 (see FIG. 11) including grooves which are configured to engage the grooved outer surface 76 of the driven portion 74 of the threaded drive shaft 54 as shown in FIGS. 6 and 7. The grooved first and second contact surfaces 82, 84 of the piezoelectric drive motor 26 may be configured to mesh with the grooved outer surface 76 of the driven portion 74 of the threaded drive shaft 54 such that ridges 86 of the grooved outer surface 76 of the driven portion 74 are disposed within valleys 88 of the grooved surfaces 82, 84 of the contact surfaces 78, 80 and vice versa. Such an arrangement may be useful to maintain a stable and consistent mechanical coupling between the piezoelectric drive motor 26 and the driven portion 74 of the threaded drive shaft 54. For some threaded drive shaft embodiments 54, an axial length of threaded portion 64 may be about 0.5 inches to about 3 inches, an axial length of the driven portion 74 may be about 0.1 inches to about 1 inch, and an overall axial length of the threaded drive shaft 54 may be about 1 inch to about 3 inches. For some embodiments, the threaded length 64 of the threaded drive shaft 54 may include a threaded outer surface 70 with a 6-80 UNS-3A type thread specification or the like. In addition, the groove structure of the outer surface 76 of the driven portion 74 may be consistent with a thread corresponding to an 8-36 UNF-2A thread having a zero pitch angle. However, any suitable thread type may be used for either the threaded portion 64 or driven portion 74. A non-grooved outer surface 76 may also be suitable for the driven portion in some instances. For some embodiments, the threaded drive shaft 54 of the compact adjustable mount 10 may be made of any suitable high strength stable material such as steel, including stainless steel, aluminum, composites, including carbon fiber composites and the like. In some cases, the threaded outer surface 70 of the threaded length 64 of the threaded drive shaft 54 and/or the grooved outer surface 76 of the driven portion 74 of the threaded drive shaft 54 may have a coating (as shown in FIG. 6A), such as a nitride coating 90, to improve lubricity, durability or any other desired characteristic of the threaded outer surface 70.

Figure 10:
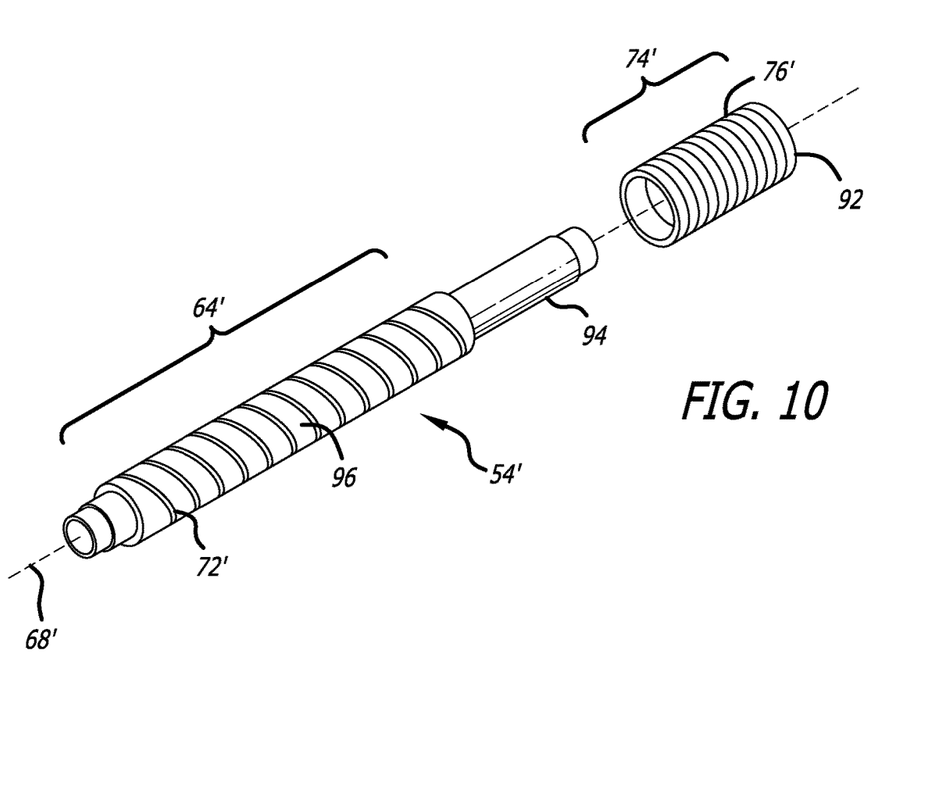
FIG. 10 is an exploded view in perspective of a two piece embodiment of the threaded drive shaft.

In some cases, the threaded drive shaft 54 may be made from a monolithic single piece of continuous material, such as the threaded drive shaft embodiment 54 shown in FIG. 9. In other cases, it may be desirable to fabricate the threaded drive shaft from two or more subcomponents, such as for the threaded drive shaft embodiment 54 shown in FIG. 10. For the threaded drive shaft embodiment 54 shown in FIG. 10, the driven portion 74 is included on a sleeve 92 that is secured to a driven portion end 94 of the main shaft 96 of the threaded drive shaft 54. The exploded view of the threaded drive shaft 54 in FIG. 10 shows the sleeve 92 detached from the main shaft. The sleeve 92 may be secured to the main shaft 96 in any suitable manner for such embodiments including by welding, soldering, brazing, adhesive bonding, press fit, sweat fit or the like. Such two piece embodiments may be useful to facilitate processing or manufacture of the threaded drive shaft 54 as well as permitting the use of different materials for the threaded portion 64 and driven portion 74 of the threaded drive shaft 54.

Figure 8:
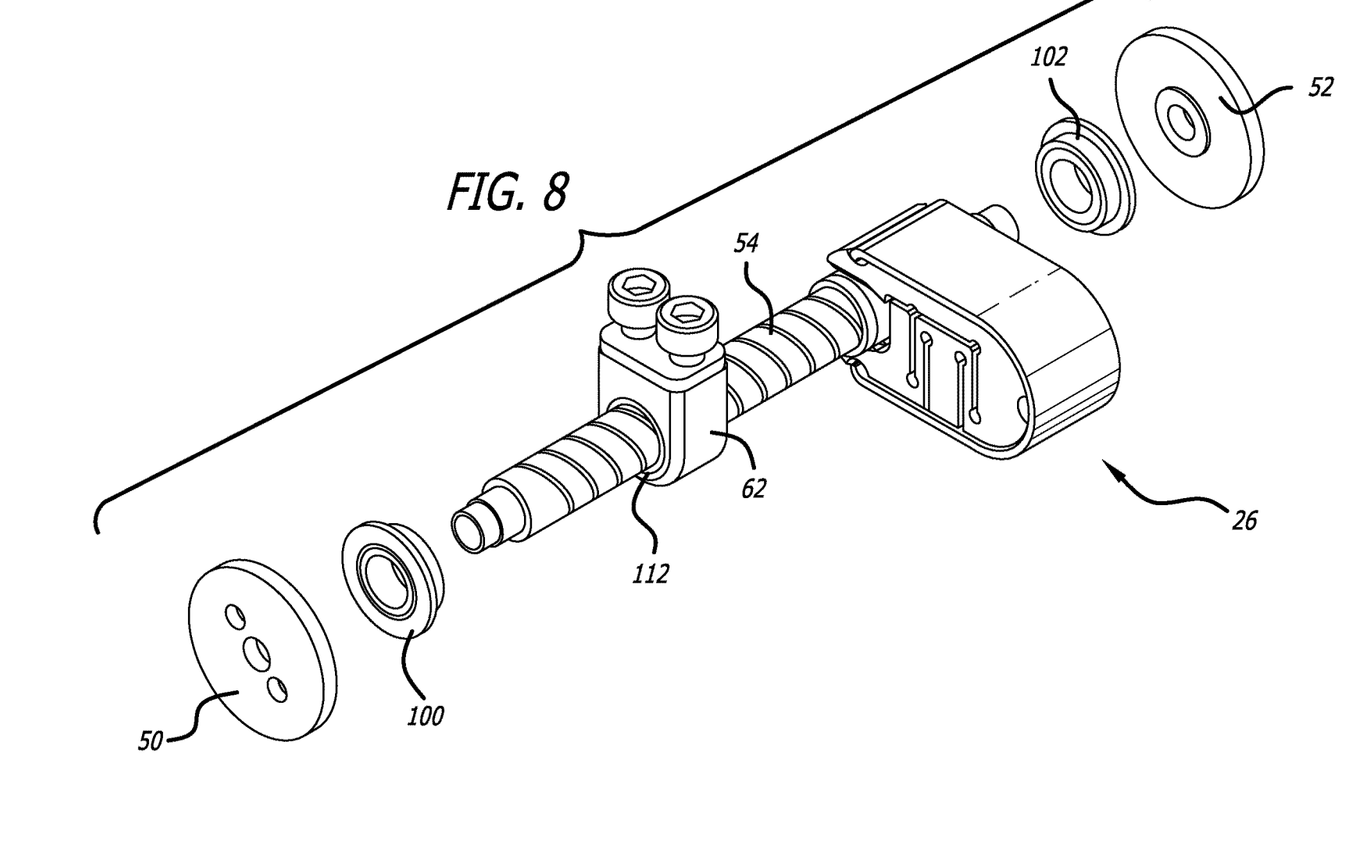
FIG. 8 is a perspective view of a subassembly of the compact adjustable mount embodiment of FIG. 1 that includes the threaded drive shaft, the piezoelectric drive motor, the threaded nut and the end caps and rotation bearings.

The threaded drive shaft 54 may be fixed in an axial direction along the longitudinal axis with respect to the base 28 and disposed within an outer perimeter 98 (as indicated by the dashed line seen in FIG. 5) of the base 28 at all times during use and displacement of the stage 20 in a linear fashion relative to the base 28. By maintaining the threaded drive shaft 54 within the outer perimeter 98 of the base 28, the compact adjustable mount 10 remains compact during use and adjustment thereby facilitation use of the compact adjustable mount 10 in confined spaces and also reducing the risk of interference with the operation of the mount 10 by structures adjacent the mount 10. The threaded drive shaft 54 may also be fixed in directions transverse to the longitudinal axis 68 of the threaded drive shaft 54 with respect to the base 28 and rotatable about the longitudinal axis 68 of the threaded drive shaft 54 with respect to the base 28. Such an arrangement whereby the threaded drive shaft 54 is fixed in all degrees of freedom except one rotational degree of freedom may be achieved by mounting the threaded drive shaft 54 to the base 28 with a pair of rotary bearings such as first rotary bearing 100 and second rotary bearing 102 shown in FIGS. 2 and 8. The first and second rotary bearings 100,102 may include ball bearings. Each rotary bearing 100,102 may have a cylindrical outer profile which is configured to fit closely within a respective inner surface of a corresponding bore 104,106 of the base 28. In some cases, fitting closely may include a close fit sufficient to allow the mount 10 to operate within desired spatial motion tolerances. In some cases this closely fitted relationship may include a press fit or slip fit. Each of the first and second rotary bearings 100,102 may include an axis of rotation 108 that is aligned and co-linear with an axis 110 of the corresponding first bore 104 and second bore 106 of the base 28 as shown in FIG. 2. When the compact adjustable mount 10 is in an operative configuration, the longitudinal axis 68 of the threaded drive shaft 54, axes of rotation of the two rotary bearings 108 and axes 110 of the first and second bore 104, 106 in the base 28 will all be co-linear with each other to facilitate smooth rotation of the threaded drive shaft 54 about the longitudinal axis 68 thereof within the drive shaft cavity 66 of a body of the base 28.

The compact adjustable mount 10 includes the nut 62, which may be a threaded nut 62 which is secured to the stage 20, which includes a bore 112 disposed about the threaded drive shaft 54 and which includes an engagement structure within the bore of the nut that is configured to engage the thread groove 72 of the threaded outer surface 70 of the threaded portion 64 of the threaded drive shaft 54. The nut 62 may be secured to the stage 20 in a configuration that prevents rotation of the nut 62 in a rotational direction about the longitudinal axis 68 of the threaded drive shaft 54. For the embodiment shown in the figures, the threaded nut 62 is secured to the stage 20 by a pair of threaded screws 114 (see FIG. 6); however, any other suitable means of attachment may be used, including adhesive bonding, welding, soldering, brazing or the like. In the configuration shown in the figures, the engagement structure of the threaded nut 62 includes a threaded inner surface of the bore 112 of the threaded nut 62 with the threads of the nut 62 corresponding to the threads of the threaded portion 64 of the threaded drive shaft 54. The threaded inner bore of the nut 62 may be sized to precisely engage the threaded outer surface 70 of the threaded drive shaft 54 to minimize backlash or other factors that might affect the accuracy or repeatability of linear movements of the compact adjustable mount 10. For such an embodiment, rotation of the threaded drive shaft 54 relative to the base 28 results in rotation of the thread groove 72 of the threaded outer surface 70 of the threaded drive shaft 54 relative to the engagement structure (threaded inner surface of the bore of the nut) and subsequent axial movement of the nut 62 and stage 20 along the longitudinal axis 68 of the threaded drive shaft 54 relative to the base 28 as a result of rotation of the threaded drive shaft 54. For some embodiments, the nut 62 may be made of any suitable high strength stable material such as steel, including stainless steel, aluminum, composites, including carbon fiber composites and the like. The nut 62 may also be made from alloys that include bronze, such as aluminum bronze, in order to enhance self-lubricating properties of the nut 62.

For some embodiments of the compact adjustable mount 10, the inertia drive motor 26 may be used to impart rotation motion on the threaded drive shaft 54 to thus translate the stage 20 relative to the base 28. As discussed above, the inertia drive motor 26 includes a piezoelectric drive motor 26 that is disposed within a drive motor cavity 116 of the base 28. In some cases, the piezoelectric drive motor 26 may be secured to the base 28 so as to allow reciprocating motion between the first contact surface 78 and second contact surface 80 against the outer surface 76 of the driven portion 74 and so as to prevent rotation of the inertia drive motor 26 itself about an axis 118 disposed between the first and second contact surfaces 78, 80 (see FIG. 11) relative to the base 28. The piezoelectric inertia drive motor 26 includes the first contact surface 78 and a second contact surface 80, the second contact surface 80 being disposed in a spaced and opposed, or substantially opposed relation relative to the first contact surface 78. The first and second contact surfaces 78, 80 may be operatively engaged with the driven portion 74 of the threaded drive shaft 54 such that actuation of the inertia drive motor 26 imparts reciprocating motion between the first contact surface 78 and second contact surface 80 resulting in rotational motion of the threaded drive shaft 54 relative to the base 28. As the first and second contact surfaces 78, 80 of the piezoelectric drive motor 26 are generally configured to engage the outer surface 76 of the driven portion 74 of the threaded drive shaft 54, the separation of the first contact surface 78 from the second contact surface 80 will be determined essentially by the outer transverse dimension (or diameter) of the driven portion 74 of the threaded drive shaft 54. However, in some instances, a nominal transverse distance between the first contact surface 78 and the second contact surface 80 of the piezoelectric drive motor may be about 1 mm to about 5 mm.

In some cases, at least one end cap may be secured in fixed relation to an end of the threaded drive shaft 54 in order to provide sufficient moment of inertia for the threaded drive shaft assembly to achieve efficient operation of the inertia drive motor system. By efficient operation of the inertia drive system, this generally means that the threaded shaft 54 has enough angular inertia to allow the contact surfaces 78, 80 to slip over the threaded shaft 54 while the threaded shaft 54 remains substantially motionless in some cases as discussed below. Each end cap or end caps 50, 52 may be secured to the threaded drive shaft 54 or associated structures of the threaded drive shaft 54 by any suitable method or device such as threaded bolts or screws, welding, soldering, brazing, adhesive bonding or the like. Such end cap embodiments 50, 52 may be disposed within the lateral outer perimeter of the base 28, include a high density material and include a moment of inertia sufficient for efficient operation of the inertial drive motor 26. For the illustrated adjustable mount embodiment 10, the first disk shaped end cap 50 is secured to a first end 120 of the threaded drive shaft 54 and a second disk shaped end cap 52 is secured to a second end 122 of the threaded drive shaft 54. Each of the first end cap 50 and second end cap 52 is disposed within an outer lateral perimeter 98 of the base 28 to maintain the compactness of the mount profile and prevent interference with adjacent devices or structures during used and adjustment of the compact adjustable mount 10. For some embodiments, either or both of the first end cap 50 and second end cap 52 may include or be made entirely of a material which has a density equal to or greater than that of stainless steel. In some cases, either or both of the first end cap 50 and second end cap 52 may include or be made entirely of a material which has a density equal to or greater than that of tungsten and either or both may be made from tungsten. For some embodiments, the end caps 50, 52 may include a high density material having a density that is greater or equal to a density of stainless steel. For some embodiments, either or both of the end caps 50, 52 may each have an outer radius of about 2 mm to about 6 mm, more specifically, about 4 mm to about 5 mm, an inner radius of about 0.5 mm to about 1 mm, a height of about 1 mm to about 3 mm, a density of about 0.015 g/mm3 to about 0.02 g/mm3, more specifically, about 0.016 g/mm3 to about 0.018 g/mm3, and a moment of inertia of about 20 gmm$^2$ to about 30 gmm$^2$. In some cases, either or both of the first and second end caps 50, 52 may each have a moment of inertia of about 10 gmm$^2$ to about 15 gmm$^2$. For some embodiments, the end caps 50, 52, may have a combined moment of inertia of about 10 gmm$^2$ to about 15 gmm$^2$, more specifically, a combined moment of inertia of about 20 mmg$^2$ to about 30 gmm$^2$.

Figure 11:
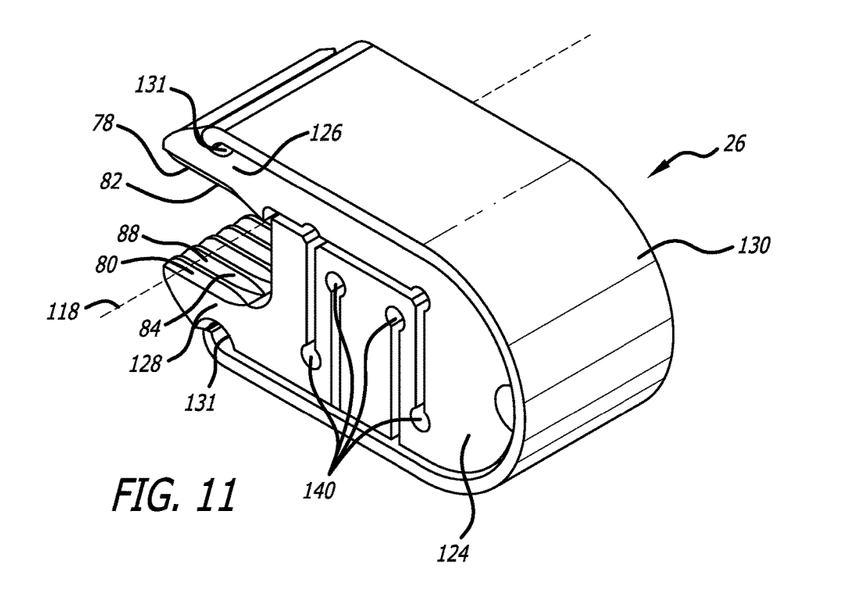
FIG. 11 is a perspective view of the piezoelectric drive motor embodiment of the compact adjustable mount embodiment of FIG. 1.
Figure 12:
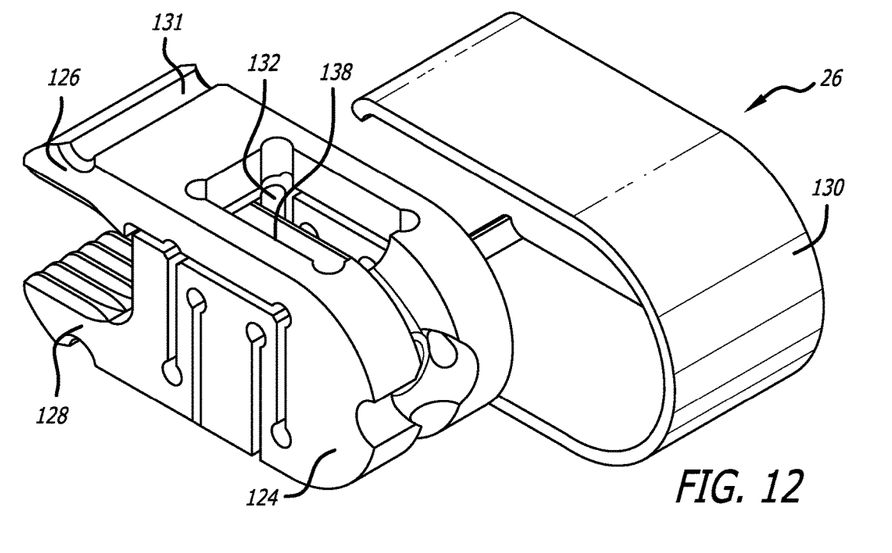
FIG. 12 is an exploded view in perspective of the piezoelectric drive motor embodiment of FIG. 11.

Referring again to the piezoelectric inertia drive motor embodiment 26 illustrated in FIG. 11, the inertia drive motor 26 includes an actuator frame 124 including a first support element 126 which includes the first contact surface 78 and a second support element 128 which includes the second contact surface 80. The second contact surface 80 is generally disposed in a spaced and opposed, or substantially opposed relation relative to the first contact surface 78. A bias spring clip 130 is engaged with transverse grooves 131 of the first support element 126 and the second support element 128 and configured to provide a resilient restoring force that resists perpendicular displacement of the first contact surface 78 away from the second contact surface 80. A piezoelectric element cavity 132 (see FIGS. 12, 13 and 15) is disposed between a first mount surface 134 of the actuator frame 124 and a second mount surface 136 of the actuator frame and is sized to receive a piezoelectric element 138. The piezoelectric element 138 is disposed within the piezoelectric element cavity 132 with a first end of the piezoelectric element 138 being secured to the first mount surface 134 and a second end of the piezoelectric element 138 being secured to the second mount surface 136. The piezoelectric element 138 is configured to expand and contract in response to an electrical driver signal transmitted to the piezoelectric element 138 through the wiring harness 22 from the controller 24 such that an expansion or contraction of the piezoelectric element 138 results in respective substantially parallel reciprocating displacement between the first contact surface 78 and the second contact surface 80. This reciprocating relative displacement between the first and second contact surfaces 78, 80 causes rotation of the threaded drive shaft 54 by inertia drive means. Use of the term substantially parallel reciprocating displacement in this context means that the first and second contact surfaces 78, 80 move back and forth relative to each other while each surface 78,80 is still in contact with the threaded drive shaft 54. The contact surfaces 78, 80 may not necessarily be completely parallel to each other and therefore may or may not engage in completely parallel reciprocating relative displacement. For some embodiments, the contact surfaces 78, 80 should be within about 10 degrees of parallel to each other.

In some cases, the first and second support elements 126, 128 of the actuator frame 124 may be formed from a unitary frame member that is cut or otherwise formed from a single piece of high strength resilient material in some cases. Such an actuator frame 124 or any other suitable frame member may include one or more hinge sections 140 of reduced material cross section disposed and coupled between the first support element 126 and second support element 128. Such hinge sections 140 may be configured to facilitate relative reciprocating parallel displacement between the first contact surface 78 and the second contact surface 80 by elastic deformation of the actuator frame material in the hinge section 140. The reduced material cross section is reduced relative to the cross section of the actuator frame 124 immediately adjacent the hinge section 140. In some cases, the reduction of the material cross section of the hinge sections 140 with respect to the nominal adjacent actuator frame material cross sections may be about 1% reduction in cross section to about 30% reduction in cross section, more specifically, about 5% reduction in cross section to about 25% reduction in cross section.

Figure 13:
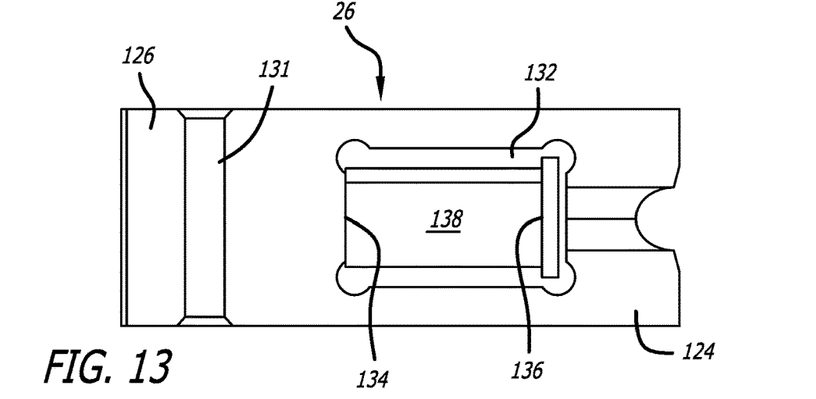
FIG. 13 is a top view of the piezoelectric drive motor embodiment of FIG. 11 with the spring bias clip not shown for purposes of illustration.
Figure 14:
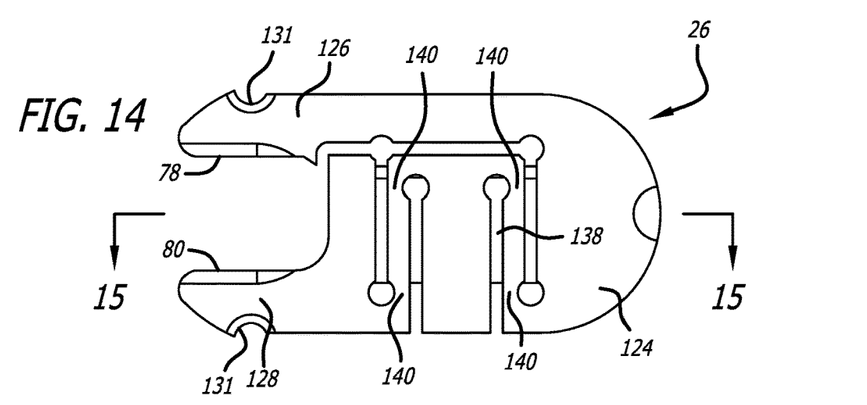
FIG. 14 is a side view of the piezoelectric drive motor embodiment of FIG. 11 with the spring bias clip not shown for purposes of illustration.
Figure 15:
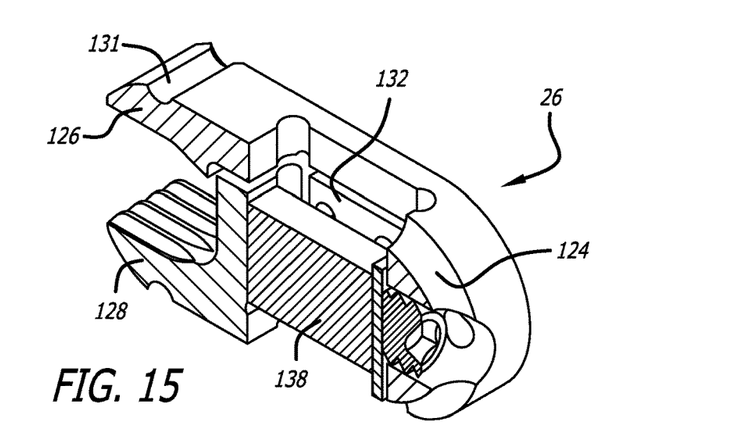
FIG. 15 is a perspective view in section of the piezoelectric drive motor embodiment of FIG. 14 with the spring bias clip not shown for purposes of illustration.

In some cases, the piezoelectric element 138 is configured as a piezoelectric crystal. The piezoelectric element 138 may have any suitable configuration, such as rectangular, square, cylindrical or the like. In some cases, the piezoelectric element 138 may have an axial length of about 1 mm to about 20 mm, more specifically about 4 mm to about 6 mm. Further the piezoelectric element 138 may have a transverse dimension of about 1 mm to about 5 mm, more specifically about 2 mm to about 4 mm. The piezoelectric element 138 shown in FIGS. 13-15 is disposed within the actuator frame 124 in the piezoelectric element cavity 132 of the actuator frame. The space between the first mount surface and second mount surface may serve to define the piezoelectric element cavity 132 in some cases. The piezoelectric element 138 may be fabricated from any suitable piezoelectric materials. For example, the piezoelectric element 138 may be fabricated from quartz, berlinite, tourmaline, barium titanate, lithium tantalate or any other suitable piezoelectric material.

During movement of the stage 20 relative to the base 28, the configuration of electrical driver signals which are sent to the piezoelectric element 138 by the controller 24 may determine the extent to which the first contact surface 78 and the second contact surface 80 interact with the threaded drive shaft 54 of the compact adjustable mount 10 during a given drive cycle. A first drive cycle may be configured to rotate the threaded drive shaft 54 of the compact adjustable mount 10 in a first angular direction during relative reciprocating motion between the first contact surface 78 and the second contact surface 80. The first drive cycle may include a first electrical driver signal which is configured such that the first contact surface 78 and the second contact surface 80 engage with and rotate the threaded drive shaft 54 of the adjustable optical mount in a first angular direction. The first drive cycle may also include a second electrical driver signal which is configured such that the first contact surface 78 and the second contact surface 80 slip over the threaded drive shaft 54 of the compact adjustable mount 10 which remains motionless or substantially motionless due to the inertia of the threaded shaft 54 and associated structures secured thereto such as end caps 50, 52 being greater than the rotational force applied to the threaded drive shaft 54 by the contact surfaces 78, 80. Use of the term substantially motionless in this context indicates that the threaded shaft will almost certainly undergo some incidental motion as the contact surfaces 78, 80 move in relative reciprocating motion with each other while in contact with the threaded shaft 54. However if the threaded shaft 54 remains substantially motionless this means that the movement of the threaded shaft 54 is far less than the motion of the contact surfaces 78, 80. In some cases, such incidental motion of the threaded shaft 54 may be less than about 30 percent of the motion of the contact surfaces 78, 80.

A second drive cycle may be configured to rotate the threaded shaft 54 of the compact adjustable mount 10 in a second angular direction. The second drive cycle may include a first electrical driver signal which is configured such that the first contact surface 78 and the second contact surface 80 slip over the threaded drive shaft 54 of the compact adjustable mount 10 which remains motionless. The second drive cycle may also include a second electrical driver signal which is configured such that the first contact surface 78 and the second contact surface 80 engage with and rotate the threaded drive shaft 54 of the compact adjustable mount 10 in a second angular direction.

In order for the first contact surface 78 and the second contact surface 80 to properly and controllably engage with and rotate the threaded drive shaft 54 of the compact adjustable mount 10, the electrical drive signal may be configured such that the magnitude of an applied voltage increases or decreases slowly until a maximum or minimum respective applied voltage is reached. The relatively slow reciprocating motion of the first contact surface 78 and the second contact surface 80 results in the restoring force applied by the bias spring clip 130 overcoming the inertial force of the threaded drive shaft 54 of the compact adjustable mount 10 thereby resulting in engagement between the first contact surface 78 and the second contact surface 80 and the threaded shaft 54 of the adjustable optical mount 10, with the subsequent rotation of the threaded shaft 54.

In order for the first contact surface 78 and the second contact surface 80 to slip over the outer surface 76 of the driven portion 74 of the threaded drive shaft 54 of the compact adjustable mount 10, the electrical drive signal may be configured such that the magnitude of an applied voltage increases or decreases quickly. The relatively quick reciprocating motion of the first contact surface 78 and the second contact surface 80 may be configured to result in the inertial force of the threaded drive shaft 54 overcoming the restoring force applied by the bias spring clip 130. This causes slipping between the first contact surface 78 and the second contact surface 80 and the threaded drive shaft 54, with the threaded shaft 54 subsequently remaining stationary. The operation of any embodiment of the piezoelectric drive motor 26 discussed herein may be configured to operate as an inertia driven system as is discussed in U.S. Pat. No. 6,911,763 to Zeigler et. al., filed May 30, 2003, titled "Closed Loop Mover Assembly with Measurement System", which is incorporated by reference herein in its entirety. Although the illustrated inertia drive motor 26 discussed above is a piezoelectric inertia drive motor 26, any suitable inertia type drive motor may be used for the compact adjustable mount embodiments contemplated herein. For example, magneto-restrictive type inertia drive motors may be used.

The compact adjustable mount embodiments 10 discussed herein may be used in either open loop or closed loop systems. For closed loop system embodiments, it may be useful to include a position measuring system on the compact adjustable mount 10. In some cases, the compact adjustable mount 10 may include a linear encoder 143 which is operatively coupled between the base 28 and the stage 20. Such a linear encoder 143 may be configured to measure relative displacement between the base 28 and the stage 20. For some mount embodiments that include a linear encoder 143 for use in a closed loop system, an encoder strip 144 of the linear encoder 143 may be secured to the stage 20 (as shown in FIG. 3) and a reader 146 of the linear encoder 143 may be secured to the base 28 (as shown in FIG. 2) adjacent the encoder strip 144 in a position that enables the reader 146 to read the encoder strip 144 during operation. In some instances, the linear encoder 143 may include an optical linear encoder such as the optical linear encoder shown in the figures. For compact adjustable mount embodiments 10 using linear encoders 143, it may also be useful to have the encoder reader 146 in operative communication through the wire harness 22 or other suitable signal transmission conduit with the controller 24. The controller 24 may include a processor 148 that is configured to process a position signal from the linear encoder 143 as well as generate suitable drive signals to the piezoelectric drive motor 26. Although a linear type encoder 143 is shown, any other suitable means of measuring the relative position of the stage relative to the base or other suitable structure may be used including rotary encoders, interferometers and the like.

With regard to the above detailed description, like reference numerals used therein may refer to like elements that may have the same or similar dimensions, materials and configurations. While particular forms of embodiments have been illustrated and described, it will be apparent that various modifications can be made without departing from the spirit and scope of the embodiments discussed. Accordingly, it is not intended that the invention be limited by the forgoing detailed description.

The entirety of each patent, patent application, publication and document referenced herein is hereby incorporated by reference. Citation of the above patents, patent applications, publications and documents is not an admission that any of the foregoing is pertinent prior art, nor does it constitute any admission as to the contents or date of these documents.

Modifications may be made to the foregoing embodiments without departing from the basic aspects of the technology. Although the technology may have been described in substantial detail with reference to one or more specific embodiments, changes may be made to the embodiments specifically disclosed in this application, yet these modifications and improvements are within the scope and spirit of the technology. The technology illustratively described herein suitably may be practiced in the absence of any element(s) not specifically disclosed herein. Thus, for example, in each instance herein any of the terms "comprising," "consisting essentially of," and "consisting of" may be replaced with either of the other two terms. The terms and expressions which have been employed are used as terms of description and not of limitation and use of such terms and expressions do not exclude any equivalents of the features shown and described or portions thereof and various modifications are possible within the scope of the technology claimed. The term "a" or "an" may refer to one of or a plurality of the elements it modifies (e.g., "a reagent" can mean one or more reagents) unless it is contextually clear either one of the elements or more than one of the elements is described. Although the present technology has been specifically disclosed by representative embodiments and optional features, modification and variation of the concepts herein disclosed may be made, and such modifications and variations may be considered within the scope of this technology.

Certain embodiments of the technology are set forth in the claim(s) that follow(s).

What is claimed is:

1. A compact adjustable mount comprising,
   a base including a mounting surface on a bottom portion of the base;
   a stage that is substantially fixed relative to the base in all degrees of freedom except a single linear degree of freedom such that the stage translates in the linear degree of freedom over a predetermined distance with respect to the base, the stage also including a mounting surface on an upper portion of the stage;
   an elongate threaded drive shaft that includes a longitudinal axis, a threaded length having a threaded outer surface with at least one thread groove concentrically disposed about the longitudinal axis and driven portion having an outer surface, the threaded drive shaft being fixed in an axial direction along the longitudinal axis with respect to the base, disposed within an outer perimeter of the base, fixed in directions transverse to the longitudinal axis with respect to the base and rotatable about the longitudinal axis with respect to the base;
   a nut which is secured to the stage, which includes a bore disposed about the threaded drive shaft, which includes an engagement structure within the bore that is configured to engage the thread groove of the threaded outer surface of the threaded drive shaft, the nut being secured to the stage in a configuration that prevents rotation of the nut in a rotational direction about the longitudinal axis of the threaded drive shaft such that rotation of the threaded drive shaft relative to the base results in rotation of the thread groove relative to the engagement structure of the nut and axial movement of the nut and stage along the longitudinal axis relative to the base;
   an inertia drive motor disposed within the base including a first contact surface and a second contact surface, the second contact surface being disposed in a spaced and opposed relation relative to the first contact surface, the first and second contact surfaces being operatively engaged with the driven portion of the threaded drive shaft such that actuation of the inertia drive motor imparts reciprocating motion between the first contact surface and second contact surface resulting in rotational motion of the threaded drive shaft relative to the base; and
   at least one end cap secured in fixed relation to an end of the threaded drive shaft, the end cap being disposed within the outer perimeter of the base, including a high density material and including a moment of inertia sufficient for efficient operation of the inertial drive motor.

2. The compact adjustable mount of claim 1 further comprising at least one linear bearing assembly operatively disposed between the base and the stage.

3. The compact adjustable mount of claim 2 wherein the at least one linear bearing assembly comprises a pair of linear ball bearing assemblies disposed between respective bearing races of the base and the stage.

4. The compact adjustable mount of claim 1 wherein the engagement structure of the nut comprises a threaded inner bore of the nut that is sized to precisely engage the threaded outer surface of the threaded drive shaft.

5. The compact adjustable mount of claim 1 wherein the threaded outer surface of the threaded length of the threaded drive shaft comprises a nitride coating to improve lubricity and durability of the threaded outer surface.

6. The compact adjustable mount of claim 1 wherein the inertia drive motor comprises a piezoelectric drive motor.

7. The compact adjustable mount of claim 1 wherein the driven portion of the threaded drive shaft comprises circumferential grooves disposed in the outer surface thereof and the first and second contact surfaces of the inertia drive motor comprise grooves configured to engage the circumferential grooves of the driven portion.

8. The compact adjustable mount of claim 1 wherein the at least one end cap comprises a high density material having a density that is greater than or equal to a density of stainless steel.

9. The compact adjustable mount of claim 8 wherein the at least one end cap comprises a material having a density equal to or greater than that of tungsten.

10. The compact adjustable mount of claim 9 wherein the at least one end cap comprises tungsten.

11. The compact adjustable mount of claim 1 comprising a first disk shaped end cap secured to a first end of the threaded drive shaft and a second disk shaped end cap secured to a second end of the threaded drive shaft, each end cap being disposed within an outer lateral perimeter of the base and each end cap comprising a material having a density equal to or greater than that of tungsten.

12. The compact adjustable mount of claim 11 wherein the end caps comprise a combined moment of inertia of about 10 $gmm^2$ to about 15 $gmm^2$.

13. The compact adjustable mount of claim 11 wherein the end caps comprise a combined moment of inertia of about 20 $gmm^2$ to about 30 $gmm^2$.

14. The compact adjustable mount of claim 1 wherein the stage comprises a height from a bottom surface of the base to the mounting surface of the stage of about 0.3 inches to about 1 inch.

15. The compact adjustable mount of claim 1 wherein the stage comprises a transverse outer dimension along a direction of translation and with the stage aligned with the base of about 0.75 inches to about 4 inches.

16. The compact adjustable mount of claim 15 wherein the stage comprises a transverse outer dimension along a direction of translation and with the stage aligned with the base of about 1.5 inches to about 3 inches.

17. The compact adjustable mount of claim 1 wherein the base and stage comprise aluminum.

18. The compact adjustable mount of claim 1 wherein the threaded drive shaft comprises stainless steel.

19. The compact adjustable mount of claim 1 wherein the inertia drive motor is secured to the base so as to allow reciprocating motion between the first contact surface and second contact surface against the outer surface of the driven portion and so as to prevent rotation of the inertia drive motor about the first and second contact surfaces relative to the base.

20. The compact adjustable mount of claim 6 wherein the inertia drive motor comprises a piezoelectric inertia drive motor which comprises:
an actuator frame, comprising:
a first support element which includes the first contact surface,
a second support element which includes the second contact surface, the second contact surface being disposed in a spaced and substantially opposed relation relative to the first contact surface,
a bias spring clip which is engaged with the first support element and the second support element and which is configured to provide a resilient restoring force that resists perpendicular displacement of the first contact surface away from the second contact surface, and
a piezoelectric element cavity disposed between a first mount surface of the actuator frame and a second mount surface of the actuator frame; and
a piezoelectric element which is disposed within the piezoelectric element cavity, which has a first end secured to the first mount surface, which has a second end secured to the second mount surface, which is configured to expand and contract in response to an electrical driver signal transmitted to the piezoelectric element and which is configured such that an expansion or contraction of the piezoelectric element results in respective substantially parallel reciprocating displacement between the first contact surface and the second contact surface.

21. The compact adjustable mount of claim 20 wherein the actuator frame further comprises a hinge section of reduced material cross section disposed and coupled between the first support element and second support element, the hinge section being configured to allow relative reciprocating parallel displacement between the first contact surface and the second contact surface by elastic deformation of the actuator frame material in the hinge section.

22. The compact adjustable mount of claim 6 wherein a nominal transverse distance between the first contact surface and the second contact surface of the piezoelectric drive motor is about 2 mm to about 5 mm.

23. The compact adjustable mount of claim 1 further comprising a linear encoder which is operatively coupled between the base and the stage and which is configured to measure relative displacement between the base and the stage.

24. The compact adjustable mount of claim 23 wherein an encoder strip of the linear encoder is secured to the stage and a reader of the linear encoder is secured to the base adjacent the encoder strip in a position that enables the reader to read the encoder strip during operation.

25. The compact adjustable mount of claim 23 wherein the linear encoder comprises an optical linear encoder.

26. A compact adjustable mount comprising,
a base;
a stage that is fixed relative to the base in all degrees of freedom except a single linear degree of freedom such that the stage translates in the linear degree of freedom;
an elongate threaded drive shaft that includes a longitudinal axis, a threaded length having a threaded outer surface with at least one thread groove concentrically disposed about the longitudinal axis and driven portion having an outer surface, the threaded drive shaft being fixed in an axial direction along the longitudinal axis with respect to the base, disposed within an outer perimeter of the base, fixed in directions transverse to the longitudinal axis with respect to the base and rotatable about the longitudinal axis with respect to the base;

a nut which is secured to the stage, which includes a bore disposed about the threaded drive shaft, which includes an engagement structure within the bore that is configured to engage the thread groove of the threaded outer surface of the threaded drive shaft such that rotation of the threaded drive shaft relative to the base results in axial movement of the nut and stage along the longitudinal axis relative to the base;

an inertia drive motor disposed within the base including at least one contact surface operatively engaged with the driven portion of the threaded drive shaft such that actuation of the inertia drive motor imparts reciprocating motion of the at least one contact surface resulting in rotational motion of the threaded drive shaft relative to the base; and at least one end cap secured in fixed relation to the threaded drive shaft, the end cap being disposed within the outer perimeter of the base, and including a moment of inertia sufficient for efficient operation of the inertia drive motor.

\* \* \* \* \*